(12) United States Patent
Ratner

(10) Patent No.: US 8,308,067 B1
(45) Date of Patent: Nov. 13, 2012

(54) STRUCTURAL DISPLAY OF VISUAL CODES

(75) Inventor: Daniel J. Ratner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/294,441

(22) Filed: Nov. 11, 2011

(51) Int. Cl.
*G06K 7/10* (2006.01)

(52) U.S. Cl. .................. 235/462.01; 235/487; 235/494; 235/462.09

(58) Field of Classification Search ............. 235/462.01, 235/487, 490, 494
See application file for complete search history.

(56) References Cited

U.S. PATENT DOCUMENTS

| | | | |
|---|---|---|---|
| 6,658,772 B2 * | 12/2003 | Haghighi | ......................... 40/511 |
| 6,950,986 B1 * | 9/2005 | Jacobi et al. | ................... 715/234 |
| 7,940,171 B2 | 5/2011 | Sahuguet | |
| 2008/0121727 A1 * | 5/2008 | Iftime et al. | ................... 235/494 |
| 2009/0029725 A1 * | 1/2009 | Gerard Kindberg | .......... 455/466 |
| 2009/0315995 A1 | 12/2009 | Khosravy et al. | |
| 2011/0039573 A1 | 2/2011 | Hardie | |
| 2011/0065451 A1 | 3/2011 | Danado et al. | |

FOREIGN PATENT DOCUMENTS

WO 2011088469 A2 7/2011

* cited by examiner

*Primary Examiner* — Kristy A Haupt
(74) *Attorney, Agent, or Firm* — McDonnell Boehnen Hulbert & Berghoff LLP

(57) ABSTRACT

An apparatus is described for displaying visual codes using structural components, and a system and method is described for modifying the visual codes.

22 Claims, 6 Drawing Sheets

STRUCTURAL DISPLAY OF VISUAL CODES

BACKGROUND

Machine-readable visual codes are a fast and efficient way to convey information in a variety of settings. One- and two-dimensional barcodes, for example, are frequently used in manufacturing, supply chain, and retail applications to track and identify products. Such codes are not readily understood by a person who simply views the code, but rather require a device or multiple devices to optically scan the code and then interpret the information contained within it.

With the rapid proliferation of mobile technology, it has become increasingly common for individuals to be in possession of a device which can read and interpret machine-readable visual codes. For example, mobile phones and tablet devices are now regularly equipped with optical hardware to capture images and the corresponding software to interpret the codes. Consequently, machine-readable visual codes are beginning to be adapted to even more applications in a person's every-day life.

SUMMARY

The disclosure herein generally relates to a visual code display apparatus comprising a plurality of structural components, wherein a visual code is defined by a corresponding physical relationship between the structural components, wherein the structural components are formed from at least one construction material.

In another embodiment, an adjustable visual code display apparatus comprises a plurality of movable structural components and a support structure configured to support the plurality of structural components in an arrangement such that the plurality of structural components are movable to form a plurality of visual codes, wherein each visual code is defined by a corresponding physical relationship between the structural components.

Also described herein is a system for control of a visual code display, the system comprising an input interface for receiving input data for at least one visual code display device, wherein the visual code display device comprises a plurality of movable structural components that are movable to form a plurality of visual codes, wherein each visual code is defined by a corresponding physical relationship between the structural components, and a communication interface for sending instructions to the at least one visual code display device, wherein the instructions comprise an indication of a visual code for display on the at least one visual code display device, wherein the visual code is selected based at least in part on the input data.

Also described herein is a computer-implemented method comprising receiving input data for at least one visual code display device, wherein the visual code display device comprises a plurality of movable structural components that are movable to form a plurality of visual codes, wherein each visual code is defined by a corresponding physical relationship between the structural components, and, in response to receiving the input data for the at least one visual code display, sending instructions to the at least one visual code display device, wherein the instructions comprise an indication of a visual code for display on the at least one visual code display device, wherein the visual code is selected based at least in part on the input data.

Also described herein is a non-transitory computer-readable medium having program instructions stored thereon that are executable by at least one processor, the program instructions comprising instructions for receiving input data for at least one visual code display device, wherein the visual code display device comprises a plurality of movable structural components that are movable to form a plurality of visual codes, wherein each visual code is defined by a corresponding physical relationship between the structural components, and instructions for, in response to receiving the input data for the at least one visual code display, sending instructions to the at least one visual code display device, wherein the instructions comprise an indication of a visual code for display on the at least one visual code display device, wherein the visual code is selected based at least in part on the input data.

These as well as other aspects, advantages, and alternatives, will become apparent to those of ordinary skill in the art by reading the following detailed description, with reference where appropriate to the accompanying drawings.

DETAILED DESCRIPTION

Figure 1:
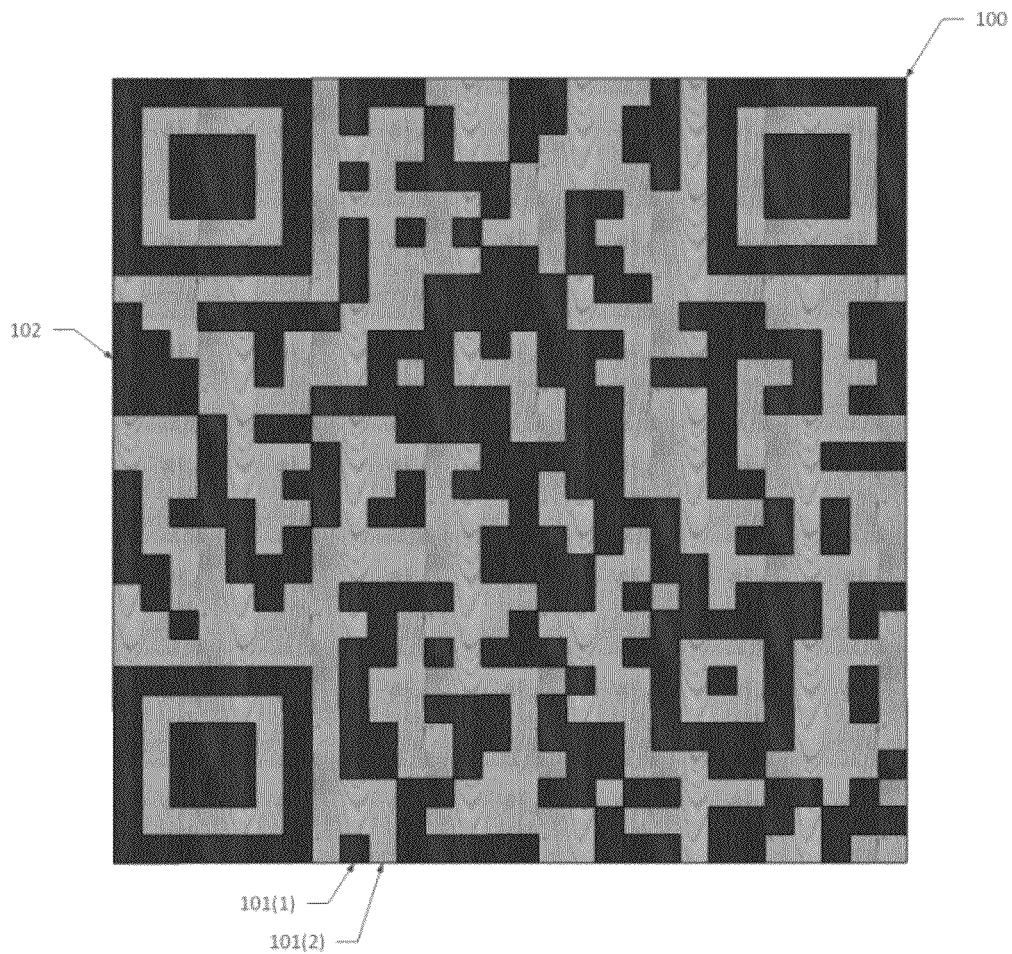
FIG. 1 is an illustration of a visual code display device according to an exemplary embodiment.

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

Visual Code Display

A device, system, and method are described for the display of machine-readable visual codes as part of a built environment. The visual codes are created from one or more structural components, wherein the physical arrangement and relationship of the components creates the code. The structural components are made of construction materials and, in addition to conveying a visual code, may simultaneously serve a more traditional function within the environment. For example, a building may contain a tiled wood floor, where one or more of the tiles use marquetry or inlay techniques to create a visual code within the patterns of the wood. The display serves as both a visual code to convey information as well as part of the floor of the building.

Herein, "construction material" should be understood to be any material that can be used in the construction of any built environment. A construction material need not have any particular property, and may be, for example, either natural or synthetic, rigid or flexible, or any combination thereof. A construction material may also be a composite formed through the combination of other materials, such as concrete.

Herein, "visual code" should be understood to be any machine-readable visual code that is not readily understood by humans, but rather requires a device to scan and interpret the code. One-dimensional codes are contemplated such as a Universal Product Code (UPC) or International Article Number (EAN) code. Two-dimensional codes are also contemplated, such as a quick-response (QR) code, high-capacity color barcode (HCCB), 3-DI, ArrayTag, Aztec Code, Codablock, Code One, Code 16K, Code 49, ColorCode, CP Code, DataGlyph, Data Matrix, Datastrip Code, Dot Code A, hueCode, INTACTA.CODE, MaxiCode, MiniCode, PDF 417, Snowflake Code, SuperCode, or Ultracode.

In addition, three-dimensional visual codes are contemplated wherein the code is not confined to a single plane. For example, a building may contain a masonry wall, where various bricks within the wall are indented or protrude from the wall's surface. The relief of the bricks thereby creates a physical pattern which further defines the visual code. The code may then be scanned by a device adapted to do so. Displaying a code in three dimensions may also help to increase the amount of information that a code can convey. Thus, a visual code may be defined using structural components in any combination of depths, heights, textures, colors, temperatures, or any other attribute which a device may be adapted to detect and scan.

In some embodiments, a visual code may be associated with a data item. The data item may be a schedule, a greeting, instructions, or any other information. For example, a visual code incorporated into the wall of a restaurant may be associated with a list of specials that the restaurant is currently offering. Similarly, a visual code may be incorporated into the concrete walkway of a public park and associated with a list of attractions, historic information about the park, directions, or geographic coordinates.

Adjustable Visual Code Display

In some embodiments, the structural components of the display may be mechanically adjusted to take on a different orientation, and therefore the resulting visual code may be changed. For example, the structural components may be manually repositioned by hand, may be raised, lowered or otherwise moved into position by a number of motors, or may be adjusted in any other manner. Those skilled in the art will recognize that there are numerous applications for such an embodiment. A restaurant, for instance, may wish to display different visual codes which are associated with different data items during the different lunch and dinner hours. Many other applications are possible as well.

An adjustable visual code display may also provide an interface which may help a user to interact with and control the display. The user may use the interface to specify particular visual codes, the time period for their display, or any other parameter. The interface may be a in the form of a website, a mobile phone or tablet application, a stand-alone computer program, or any other type of interface, any of which may be adapted to remotely control the display via a network connection (e.g. the internet). Alternatively, the interface may be directly connected to the display, allowing a user to control it without the need of a network connection. It is further contemplated that an interface may be adapted for the control of multiple adjustable visual code displays.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Exemplary Embodiments

FIG. 1 is an illustration of a visual code display 100 according to an exemplary embodiment. The display is constructed with structural components 101(1), 101(2) which are made from wood. These components could alternatively be stone, metal, leather, rubber, glass, plastic, synthetic fiber, or any other construction material. The structural components 101(1), 101(2) are arranged such that their physical orientation and relationship to each other define the visual code 102. The resulting visual code 102 in FIG. 1 resembles a QR code, but the structural components 101(1), 101(2) could be arranged to take the form of any other machine-readable visual code. A visual code display 100 of this kind may be integrated into the construction of a building or any other built environment.

Figure 2A:
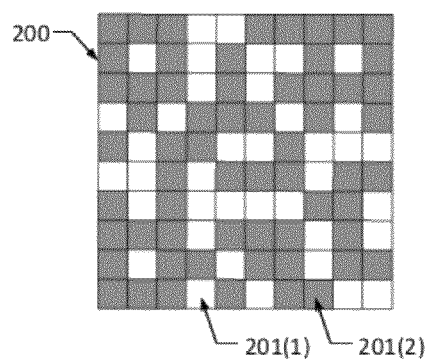
FIG. 2A is another illustration of a visual code display device according to an exemplary embodiment.

FIG. 2A illustrates another embodiment of a visual code display 200, in which structural components 201(1), 201(2) made from one or more construction materials are arranged to create a visual code. The resulting code in FIG. 2A again resembles a QR code, although it is less detailed than the code shown in FIG. 1.

Figure 2B:
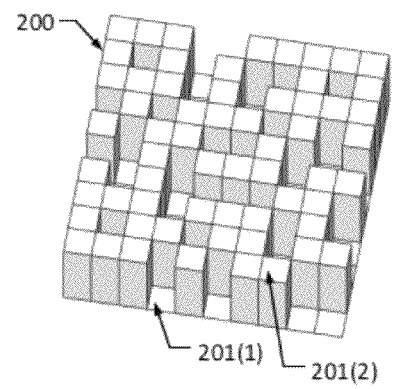
FIG. 2B is another illustration of a visual code display device according to an exemplary embodiment.

FIG. 2B illustrates another embodiment of the same visual display 200. However, in FIG. 2B it is contemplated that the structural components 201(1), 201(2) may be arranged in three dimensions rather than only two. Accordingly, the visual code may be formed in a relief pattern through the differences in height of the structural components 201(1), 201(2), rather than by differences in material or color as shown in FIG. 2A. Despite the different manner of display in FIG. 2B, the result is the same pattern and thus the same visual code.

Figure 2C:
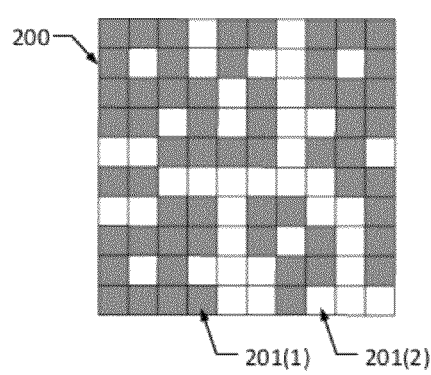
FIG. 2C is another illustration of a visual code display device according to an exemplary embodiment.

FIG. 2C illustrates the visual code display 200, wherein the structural components 201(1), 201(2) are again arranged in a two-dimensional pattern. However, it is a different pattern than that shown in FIG. 2A, and therefore a different visual code is displayed.

Figure 2D:
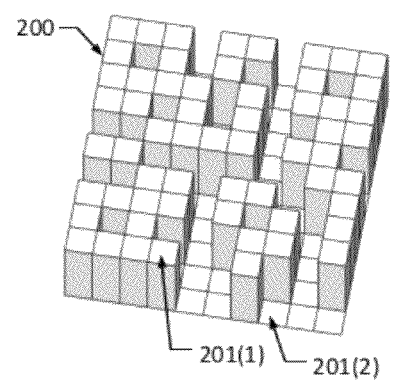
FIG. 2D is another illustration of a visual code display device according to an exemplary embodiment.

Similarly, FIG. 2D illustrates the visual code display 200, wherein the same visual code shown in FIG. 2C is displayed in a different manner. The individual structural components 201(1), 201(2) have been raised or lowered to form a relief pattern, similar to that shown in FIG. 2B.

One skilled in the art would recognize that no manner of displaying visual codes contemplated herein is mutually exclusive of any other. Thus, a visual code displayed in three dimensions may also include color, material, or any other variations to add complexity to the code.

Figure 3:
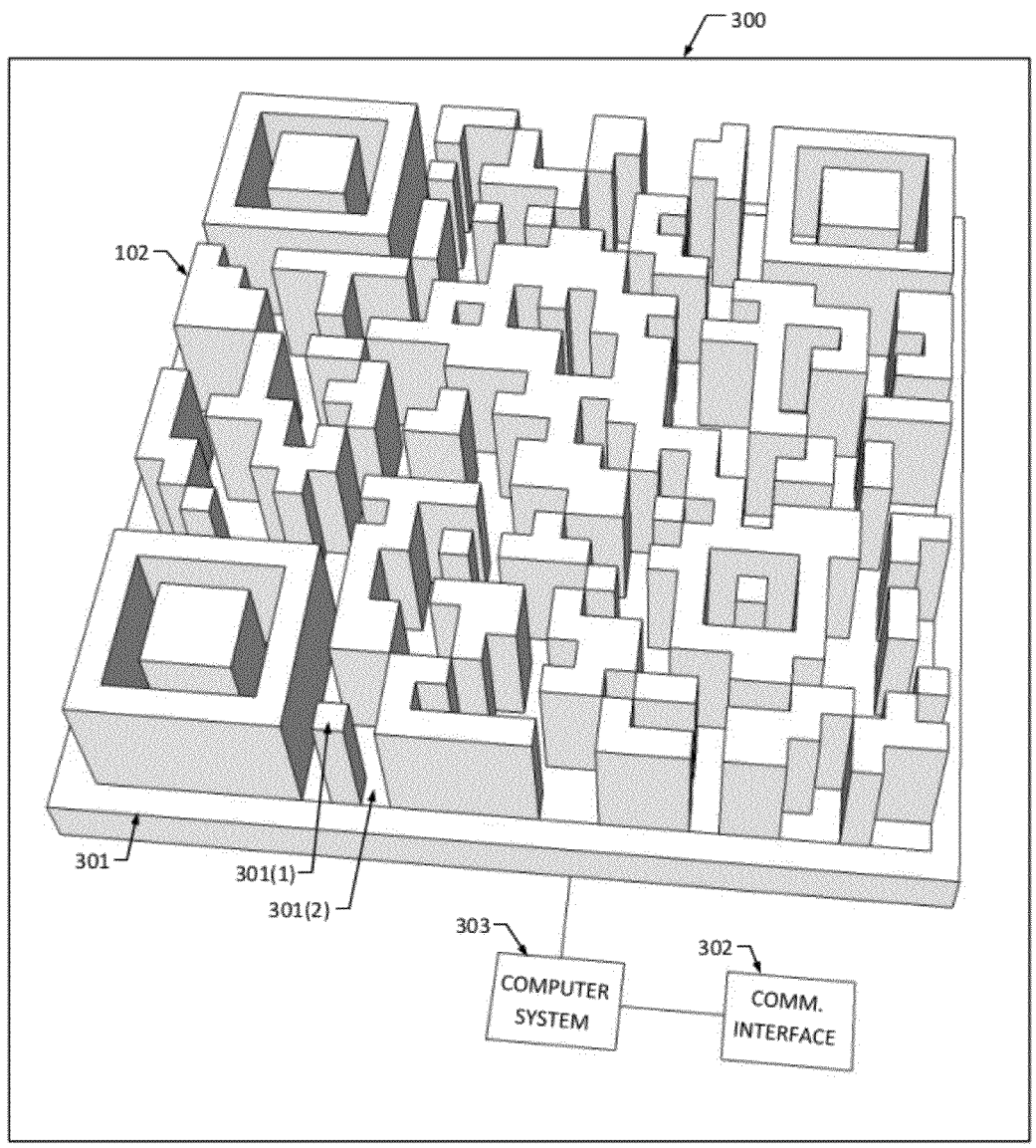
FIG. 3 is an illustration of an adjustable visual code display device according to an exemplary embodiment.

FIG. 3 illustrates another embodiment of a visual code display 300 in which the visual code is displayed in a relief pattern. The display is constructed with structural components 301(1), 301(2) which may be made from any construction material, and are arranged such that their physical orientation and relationship to each other define the visual code 102. The resulting visual code 102 in FIG. 3 resembles a QR code, and it is the same visual code 102 that is displayed in FIG. 1. Again, as described above, the structural components 301(1), 301(2) could be arranged to take the form of any other machine-readable visual code.

The structural components 301(1), 301(2) may additionally include a number of light sources. The light sources may introduce light patterns and/or color variations which may further define the visual code 102.

In some embodiments, the structural components 301(1), 301(2) may be connected to a support structure 301 which allows them to move with respect to one another. In FIG. 3, the structural components 301(1), 301(2) may be raised and/or lowered into position manually, by a number of motors, or by any other means. In this way, the structural components 301(1), 301(2) may be adjusted to take on a different orientation, and therefore the visual code 102 may be changed.

One skilled in the art would also recognize that some individual structural components in an adjustable visual code display might be linked together, or that some components may remain in a predetermined position while others are movable. For instance, QR codes contain certain fixed patterns which appear in every code, such as the concentric squares in the corners of each code. In an adjustable visual code display adapted to display QR codes, some components may remain in a position corresponding to these fixed patterns, while the other components are movable to change the code that is displayed.

An additional feature of this embodiment may be a communication interface 302 which is adapted to receive instructions for the visual code 102 that is to be displayed. This feature may help to allow a user to specify a new visual code 102 for display, a time period for its display, or any other parameter.

After receiving instructions from the communication interface 302, a computer system 303 then interprets them and moves the structural components 301(1), 301(2) into the desired orientation according to the received instructions. Alternatively, the adjustable visual code display 300 may contain program instructions in any form of hardware, software, or firmware which similarly interpret the received instructions and move the structural components 301(1), 301(2) into the desired orientation according to the received instructions.

Figure 4A:
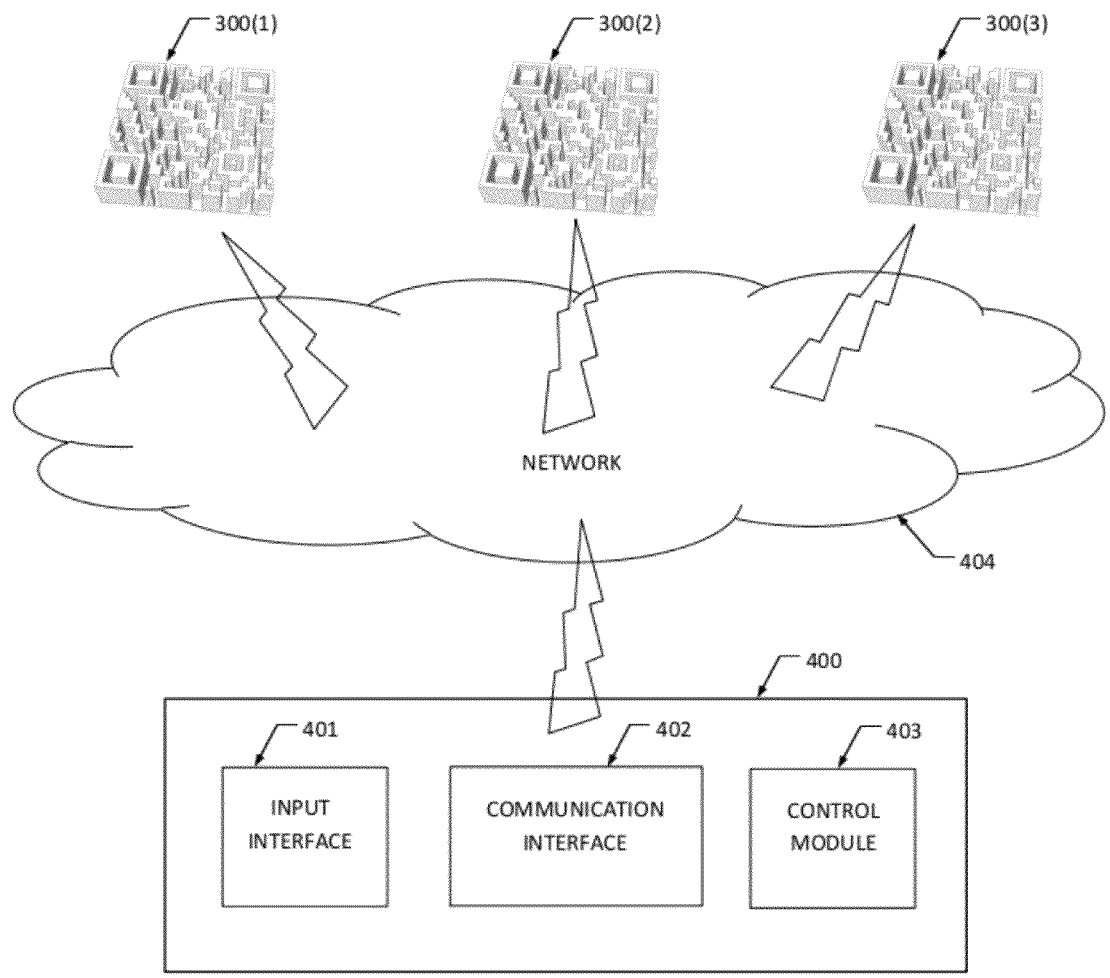
FIG. 4A is an illustration showing a control system for the visual code display according to an exemplary embodiment.

FIG. 4A is an illustration of another embodiment of a control system 400 for one or more adjustable visual code displays 300. The control system 400 may control multiple adjustable visual code displays 300 via a network 404 such as the internet. The control system 400 contains an input interface 401 which receives input data for the adjustable visual code displays 300. The input data may specify a certain code to display, a certain time to display it, or any other parameter. A communication interface 402 then indicates the visual code 102 for display based on the input data, and sends instructions identifying the visual code 102 to the adjustable visual code displays 300. Each display then interprets the instructions and moves its corresponding structural components 301(1), 301(2) into the desired visual code 102 according to the instructions.

Additionally, the input data for the adjustable visual code displays 300 may specify a data item which is associated with the desired visual code 102. The data item may be location specific information such as directions or geographic coordinates, media content such as a document or webpage address, or any other data.

It will be understood that the control system 400 may specify multiple visual codes 102, associated with multiple data items, for display on multiple display devices 300. It will also be understood that the control system 400 may specify a single visual code 102, associated with one data item, for display on multiple display devices 300. For instance, a control system 400 may control multiple display devices 300 in the same building. In an emergency situation, the control system 400 may direct all of the display devices 300 to display the same visual code 102 associated with a single data item describing evacuation procedures.

An additional feature of the control system 400 may be a control module 403 which generates a visual code 102 for association with a certain data item, based on the instructions contained in the input data. In some situations, the control module 403 may create a random visual code 102(1) for each new data item that is introduced. Alternatively, the control module 403 may determine a predefined visual code 102(2) which has already been associated with a particular data item.

For example, a retail store displaying a visual code 102(2) previously associated with a description of its hours of operation wishes to instead display a different visual code 102(1) associated with a description of new merchandise. In such a case, the control module 403 would generate a random visual code 102(1) and associate it with the new data item. If the retail store later wished to again display the visual code 102(2) associated with a description of its hours of operation, the control module 403 would determine the previously defined visual code 102(2) for display, which is already associated with the previous data item.

It is also contemplated that the control system 400 may alternatively contain program instructions in any form of hardware, software or firmware which perform any of the functions that the elements of the control system 400 would otherwise perform.

Figure 4B:
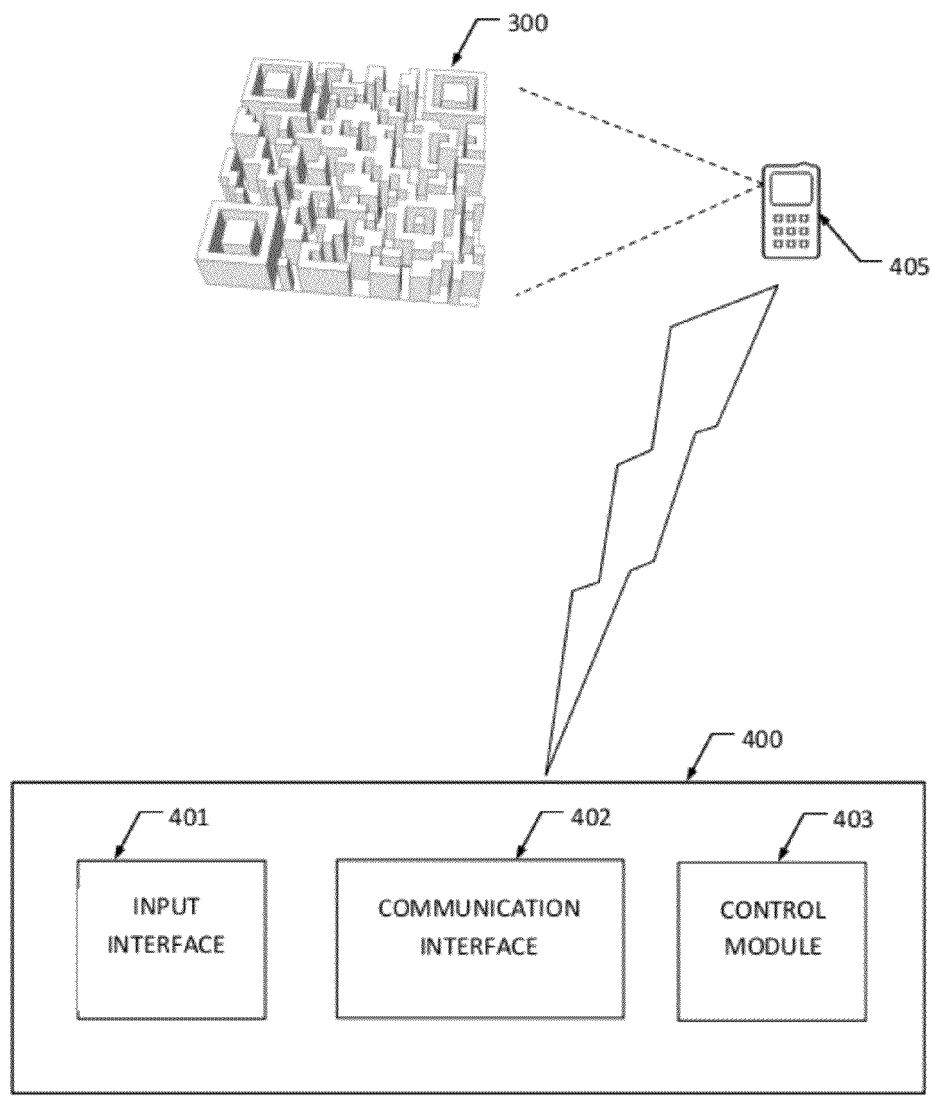
FIG. 4B is an illustration showing an exemplary interaction between the control system for the visual code display of FIG. 3A and a computing device.

FIG. 4B is an illustration showing an exemplary interaction between the control system 400 for the adjustable visual code display 300 and a computing device 405. The computing device 405 may be a mobile phone, tablet, or any other device with optical scanning capability. Once a visual code 102 is displayed, it may be scanned by a user's computing device 405. The communication interface 402 may then receive an indication from the computing device 405 that the device has scanned the visual code 102. Upon receiving this indication, the control module 403 may initiate an action based on the data item that is associated with that visual code 102.

In some embodiments, the computing device 405 may be associated with a user profile. In this case, upon receiving an indication that a computing device 405 has scanned the visual code 102, the control module 403 may determine the user profile associated with the computing device 405. Then, the computing device 404 may initiate an action based on both the user profile and the data item that is associated with that visual code 102.

For example, an adjustable visual code display 300 may be integrated into the floor of a hotel lobby. It displays a visual code 102, which a guest scans with the optical reader on a mobile phone. In response to the scan, the control module 403 determines the user profile of that guest, and initiates an action which will check in that guest under an existing reservation and send a confirmation to the mobile phone.

Figure 5:
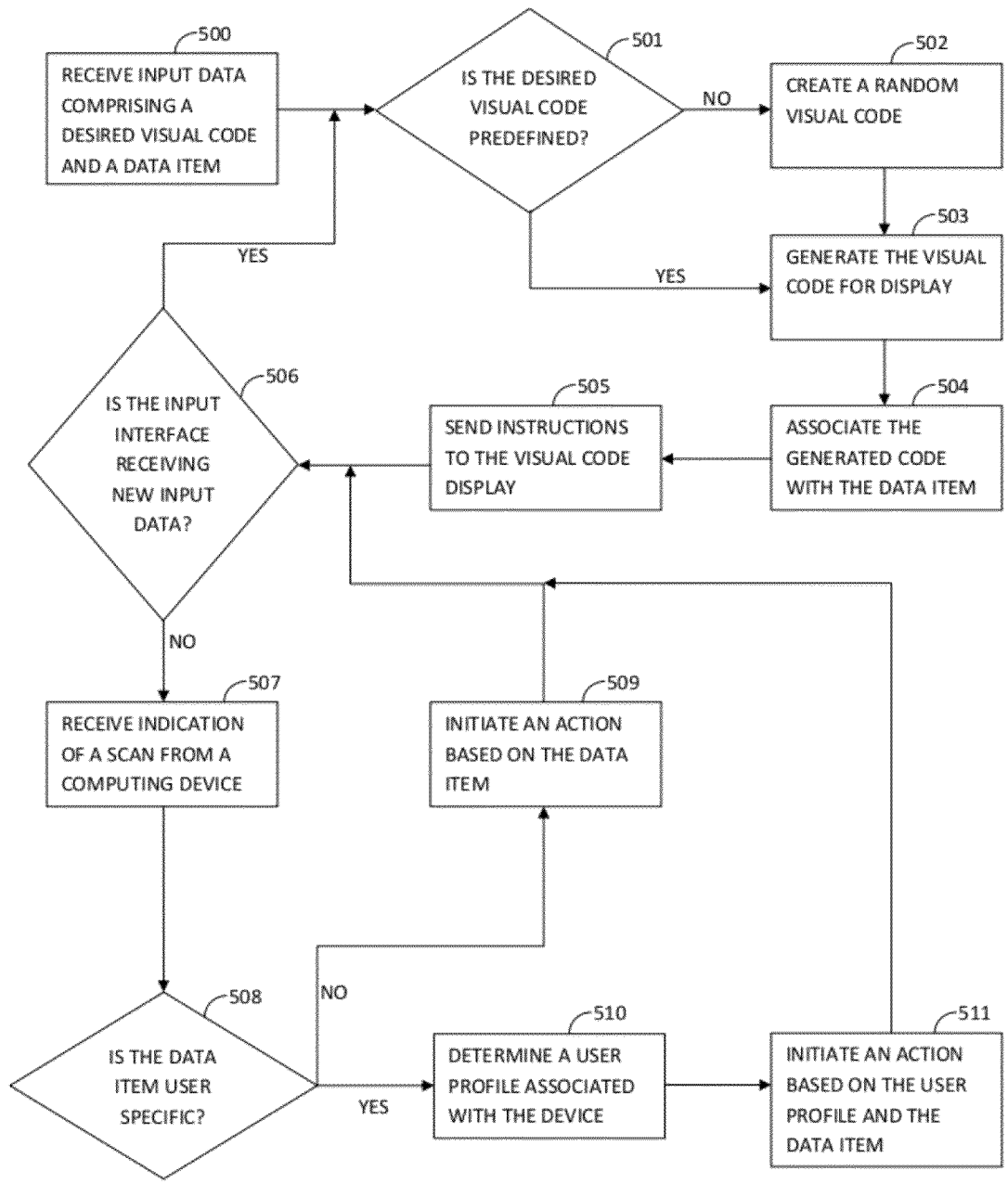
FIG. 5 is a flow chart illustrating a method for operating a visual code display according to an exemplary embodiment.

FIG. 5 is a flow chart illustrating a method for displaying visual codes according to an exemplary embodiment. An input interface 401 receives 500 input data for at least one adjustable visual code display device 300. Based on the input data, a control module 403 determines 501 whether the visual code 102 to be generated has been previously defined, or if it must be created. If a new visual code 102 must be created, the control module 403 creates 502 it. Then, the control module 403 generates 503 either the previously defined or the newly created visual code 102.

Once the visual code 102 is generated, the control module 403 associates 504 the visual code 102 with a data item according to the input data. A communication interface 402 then sends 505 instructions to the adjustable visual code display device 300 for the visual code 102 that is to be displayed.

After a visual code 102 is displayed, the adjustable visual code display device 300 may be adjusted to display a different visual code. This will occur if the control module 403 determines 506 that the input interface 401 is being engaged to receive 500 further input data. If so, the control module 403 will proceed as above until the different visual code 102 is displayed. Otherwise, users may scan the displayed visual code 102 with a computing device 405.

When a user scans the visual code 102, the communication interface 402 receives 507 an indication from the computing device 405 that the device has scanned the visual code 102. The control module 403 will then determine 508 whether the data item associated that that visual code 102 is user specific or not. If not, the control module 403 simply initiates 509 an action based on that data item. However, if the data item is user specific, the control module 403 will determine 510 a user profile associated with the computing device 405, and then initiate 511 an action based on both the user profile and the data item associated with the visual code 102.

Thereafter, the control module 403 may either determine 506 that the input interface 401 is being engaged to receive 500 further input data, or it may once again receive 507 an indication from the computing device 405 that the device has scanned the visual code 102.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. An adjustable visual code display apparatus comprising:
    a plurality of movable structural components; and
    a support structure configured to support the plurality of structural components in an arrangement such that the plurality of structural components are movable to form a plurality of machine-readable visual codes, wherein each machine-readable visual code is defined by a corresponding physical relationship between the structural components.

2. The apparatus of claim 1 further comprising a communication interface for receiving instructions indicating a machine-readable visual code to be displayed.

3. The apparatus of claim 2 further comprising a computer system for interpreting the received instructions and moving the plurality of structural components according to the received instructions.

4. The apparatus of claim 2 further comprising program instructions stored on a non-transitory computer-readable medium and executable by at least one processor to:
    interpret the received instructions; and
    move the plurality of structural components according to the received instructions.

5. The apparatus of claim 2 wherein the structural components are formed from at least one construction material.

6. The apparatus of claim 5 wherein the at least one construction material comprises at least one of the following: wood, stone, metal, leather, rubber, glass, plastic, synthetic fiber, or concrete.

7. The apparatus of claim 2 wherein each of two or more of the structural components comprise a light source and wherein at least one of the machine-readable visual codes is further defined by a collective pattern of the light sources.

8. The apparatus of claim 2 wherein the machine-readable visual code comprises at least one of the following: a one-dimensional barcode, a QR code, or a high capacity color barcode.

9. A system for control of a visual code display, the system comprising:
    an input interface for receiving input data for at least one visual code display device, wherein the visual code display device comprises a plurality of movable structural components that are movable to form a plurality of machine-readable visual codes, wherein each machine-readable visual code is defined by a corresponding physical relationship between the structural components; and
    a communication interface for sending instructions to the at least one visual code display device, wherein the instructions comprise an indication of a machine-readable visual code for display on the at least one visual code display device, wherein the machine-readable visual code is selected based at least in part on the input data.

10. The system of claim 9 wherein the input data specifies at least one data item for association with the plurality of machine-readable visual codes.

11. The system of claim 10 wherein the at least one data item comprises at least one of the following: media content, geographic coordinates, or an action to be performed.

12. The system of claim 10 further comprising a control module, wherein the control module is configured to generate the machine-readable visual code and associate the at least one data item with the machine-readable visual code.

13. The system of claim 10 further comprising a control module, wherein the control module is configured to determine a predefined machine-readable visual code that is associated with the data item.

14. The system of claim 10 wherein the input data specifies the timing for display of the machine-readable visual code on the at least one visual code display device.

15. The system of claim 10 wherein the communication interface receives an indication from a computing device that the device has scanned the machine-readable visual code.

16. The system of claim 15 further comprising a control module, wherein the control module is configured, in response to receipt of the indication from the computing device, to initiate an action based on the data item associated with the machine-readable visual code.

17. The system of claim 15 further comprising a control module, wherein the control module is configured, in response to receipt of the indication from the computing device, to determine a user profile associated with the computing device and initiate an action based on:
    the user profile; and
    the data item associated with the machine-readable visual code.

18. A non-transitory computer-readable medium having program instructions stored thereon which are executable by at least one processor, the program instructions comprising:
    instructions for receiving input data for at least one visual code display device, wherein the visual code display device comprises a plurality of movable structural components that are movable to form a plurality of machine-readable visual codes, wherein each machine-readable visual code is defined by a corresponding physical relationship between the structural components; and instructions for, in response to receiving the input data for the at least one visual code display device, sending instructions to the at least one visual code display device, wherein the instructions comprise an indication of a machine-readable visual code for display on the at least one visual code display device, wherein the machine-readable visual code is selected based at least in part on the input data.

19. A visual code display apparatus comprising:
a plurality of structural components, wherein a machine-readable visual code is defined by a corresponding physical relationship between the structural components, wherein the structural components are formed from at least one construction material, wherein the at least one construction materials comprise at least one of the following: wood, stone, metal, leather, rubber, glass, plastic, synthetic fiber, or concrete.

20. A visual code display apparatus comprising:
a plurality of structural components, wherein a machine-readable visual code is defined by a corresponding physical relationship between the structural components, wherein the structural components are formed from at least one construction material, wherein each of two or more of the structural components comprise a light source and wherein the machine-readable visual code is further defined by a collective pattern of the light sources.

21. The apparatus of claim 19 wherein the machine-readable visual code comprises at least one of the following: a one-dimensional bar code, a QR code, or a high capacity color barcode.

22. The apparatus of claim 20 wherein the machine-readable visual code comprises at least one of the following: a one-dimensional bar code, a QR code, or a high capacity color barcode.

* * * * *